United States Patent
Miller et al.

(10) Patent No.: US 12,297,940 B2
(45) Date of Patent: May 13, 2025

(54) FABRIC AND ELASTOMERIC SEAL FOR FLANGED CONNECTIONS

(71) Applicant: Utex Industries Inc., Houston, TX (US)

(72) Inventors: John Miller, Weimar, TX (US); Zachery Kokel, Houston, TX (US)

(73) Assignee: Utex Industries Inc., Mansfield, TX (US)

( * ) Notice: Subject to any disclaimer, the term of this patent is extended or adjusted under 35 U.S.C. 154(b) by 0 days.

(21) Appl. No.: 18/236,578

(22) Filed: Aug. 22, 2023

(65) Prior Publication Data

US 2024/0060583 A1 Feb. 22, 2024

Related U.S. Application Data

(60) Provisional application No. 63/399,726, filed on Aug. 22, 2022.

(51) Int. Cl.
*F16L 23/22* (2006.01)
*F16J 15/10* (2006.01)
*F16J 15/22* (2006.01)

(52) U.S. Cl.
CPC .......... *F16L 23/22* (2013.01); *F16J 15/102* (2013.01); *F16J 15/22* (2013.01)

(58) Field of Classification Search
CPC ........ F16J 15/022; F16J 15/102; F16J 15/108; F16L 23/22
USPC ................. 277/608, 610, 614, 627
See application file for complete search history.

(56) References Cited

U.S. PATENT DOCUMENTS

| | | | | |
|---|---|---|---|---|
| 816,478 A * | 3/1906 | Kirschning | ............ | F16J 15/125 277/610 |
| 1,669,030 A * | 5/1928 | Wilkinson | ............ | F16J 15/104 277/541 |
| 2,354,538 A * | 7/1944 | Parker | ................. | F16L 27/1008 285/348 |
| 2,676,823 A * | 4/1954 | Olson | .................... | B29C 70/347 264/137 |
| 3,627,337 A * | 12/1971 | Pippert | ................ | F16J 15/3284 277/924 |
| 3,664,908 A * | 5/1972 | Horvath | .................... | B32B 5/26 428/188 |
| 4,214,761 A * | 7/1980 | Pippert | .................... | F16J 15/20 277/540 |
| 10,364,892 B2 * | 7/2019 | Singh | .................... | F16L 15/003 |
| 2017/0130843 A1 * | 5/2017 | Singh | .................... | E21B 17/042 |
| 2017/0146127 A1 * | 5/2017 | Singh | .................... | F16J 15/108 |
| 2019/0360594 A1 * | 11/2019 | Singh | .................... | F16J 15/122 |

* cited by examiner

Primary Examiner — Nicholas L Foster
(74) Attorney, Agent, or Firm — James Robert (Jim) Johnson

(57) ABSTRACT

A reusable flexible seal is made from a plurality of bonded layers of a fiber base impregnated with an elastomeric material. The flexible seal is sized and shaped to be compressed in a shaped groove created between two pipeline elements to be connected together. At least one layer of fabric may be disposed in a preferred embodiment on the surface of the flexible seal to help prevent extrusion of the elastomer of the flexible seal the joint between the connected pipeline elements during connection. A plastic or steel band may be disposed in the outward radial direction of the groove to improve the prevention of seepage or leakage.

15 Claims, 19 Drawing Sheets

FABRIC AND ELASTOMERIC SEAL FOR FLANGED CONNECTIONS

BACKGROUND OF THE INVENTION

Pipelines are commonly used to transport oil and other fluids under high pressure. Pipelines may be a few feet long or thousands of miles long. These pipelines are typically comprised of multiple pipeline elements connected end to end. Because of the hazards posed by a leak at a connection between two pipeline elements, each pipeline element must be connected to the next element in a way which prevents seepage, leakage or spillage of oil or other fluids transported through the pipeline. In between pipeline elements, this is typically done through the use of a seal between the mated ends of two connected pipeline elements. The pipeline element connection is optimally done in such a way as to permit maintenance, disconnection and reconnection of the pipeline elements.

Given the nature of many types of fluids transported through pipelines, leaks or spills can pose serious hazards to the environment, to animals or to humans who come into contact with the exposed fluids. Because of these hazards, reliable seals are necessary. To reduce costs, reusable seals are preferable.

In order to create reliable, reusable connections between pipeline elements, each pipeline element has disposed on each connection end thereof a flat mounting surface having disposed therein a groove sized, shaped and positioned to accept a seal. The seal grooves in the mounting surface of the pipeline elements generally conform to American Petroleum Institute ("API") standards, and two grooves align when two pipeline elements are positioned to be connected. A flange is integrated into each end of the pipeline element. For a bolted connection, each integrated flange has disposed therein a plurality of holes sized and spaced to receive the threaded element of a bolt. Flanges, grooves and pluralities of bolt holes are sized and positioned to allow one flanged end of a pipeline element to be bolted to the flanged end of another pipeline element to form a joint. A nut is used on each bolt to secure the connection. When the nuts are tightened on the bolts, the mounting surfaces of two pipeline elements are joined and compressed against each other, thereby compressing a seal disposed in the grooves therein, forming a seal.

In alternate embodiments, an all thread and two nuts are used in place of each nut and bolt. In this disclosure a reference to nuts and bolts can refer to an all thread and two nuts.

Many industry standards call for the use of a metal seal inserted into the aligned groove on each of two pipeline elements to be joined together to seal the joint when nuts and bolts are threaded together in the bolt holes of the flanged ends of the joined pipeline elements.

The known metal seal is made from a softer (more malleable) metal than the metal comprising each pipeline element. The groove in each pipeline element is made in a circular shape cut concentrically into the flat surface of each pipeline element. The width of the metal seal where the metal seal makes contact with the groove is generally smaller than the width of the groove. The metal seal has a cross-sectional shape measurably distinct from the cross-sectional shape of the joined grooves. In order to form a seal, the metal seal is compressed by the sides of the groove as the flanges of the two pipeline elements are bolted together and tightened. The metal seal, being made of a softer metal than the metal of each pipeline element, is deformed and pressed under compression against at least two opposing sides of the groove elements and further may be compressed in at least one direction within each groove in order to be expanded to fill the space in another direction across the width of the groove elements.

Metal seals are difficult to work with and wasteful. Pipelines which transport oil or other fluids require routine maintenance. A metal seal may be used only once, since the deformation imposed on it during installation is permanent. The deformed metal seal must be pried from the groove, which effort may result in damage to the groove or surrounding area of the mounting end of a pipeline element. If the groove or surrounding area is damaged, the entire pipeline element may have to be replaced. Further, tightening the bolts of the flanges sufficiently to compress and deform the metal seal takes considerable labor.

Many types of metal seals are known to have the potential to create a cavity within a groove element during use. Corrosive fluid may enter the cavity and degrade the metal seal gland. This may render the gland to be prone to leakage.

In some applications, a metal seal may have disposed on its surface an elastomeric coating to aid installation. The elastomeric coating can be compressed during connection of two pipeline elements to assist in forming a seal. However, to prevent extrusion of the elastomer, there still must be permanent deformation of the metal seal to effect a reliable seal. Also, while this type of seal may be more easily installed, it must still be replaced during maintenance.

There is a need for a seal which improves ease of installation and service while also being (i) less prone to damaging the seal gland, (ii) able to preserve the condition of the seal gland and (3) is capable of creating a seal on a damaged seal gland. The present invention meets those needs and also creates an overall more robust and reliable seal for applications that do not require a metal seal.

SUMMARY OF THE INVENTION

The invention is a composite elastomeric ring seal comprised of bonded layers of woven, matted or mesh fabric in which each layer of fabric is impregnated with an elastomeric material. In this disclosure, the term "fabric" refers generally to any form of woven, matted or meshed fiber material suitable to possess the ability to be compressed or stretched under potentially extreme loads and further which is suitable to have bonded or permanently affixed thereto an elastomeric material. Individual layers of fibric containing impregnated elastomers are then bonded together in a stack or pile and shaped into a ring to fit into a standard API groove or similar groove disposed in a connection end of a pipeline element. Although any API or non-API groove may be used, this disclosure typically makes reference to API-type grooves for convenience. The cross-sectional shape of the elastomeric ring may be the same as the cross-sectional shape of two aligned groove elements disposed in two joined pipeline elements or may differ slightly. In preferred embodiments, the volume of the elastomeric ring is slightly larger (10% larger more or less) than the volume of the aligned groove elements in order to ensure compression. As with the metal seal, sealing is accomplished by compression of the seal in the grooves.

In a preferred embodiment, the elastomeric ring further comprises one or more layers of fabric disposed on the surface thereof. The surface fabric may be the same material as the fabric comprising each layer of the elastomeric ring or may differ. In additional embodiments, coiled springs or rigid plastic or metal structures may be incorporated into or onto the surface of the elastomeric ring to provide extrusion resistance during use and/or seal integrity, either with or without the use of a surface fabric.

Likewise, the elastomeric seal may comprise a protruding strut or other surface feature disposed toward the inner diameter direction of the seal. Such a protruding strut or surface feature may be suitable to work within standard aligned groove elements or the aligned groove elements may be modified to incorporate the protruding strut or surface feature of elastomeric seal.

FIGURES

DETAILED DESCRIPTION OF THE INVENTION

Figure 1:
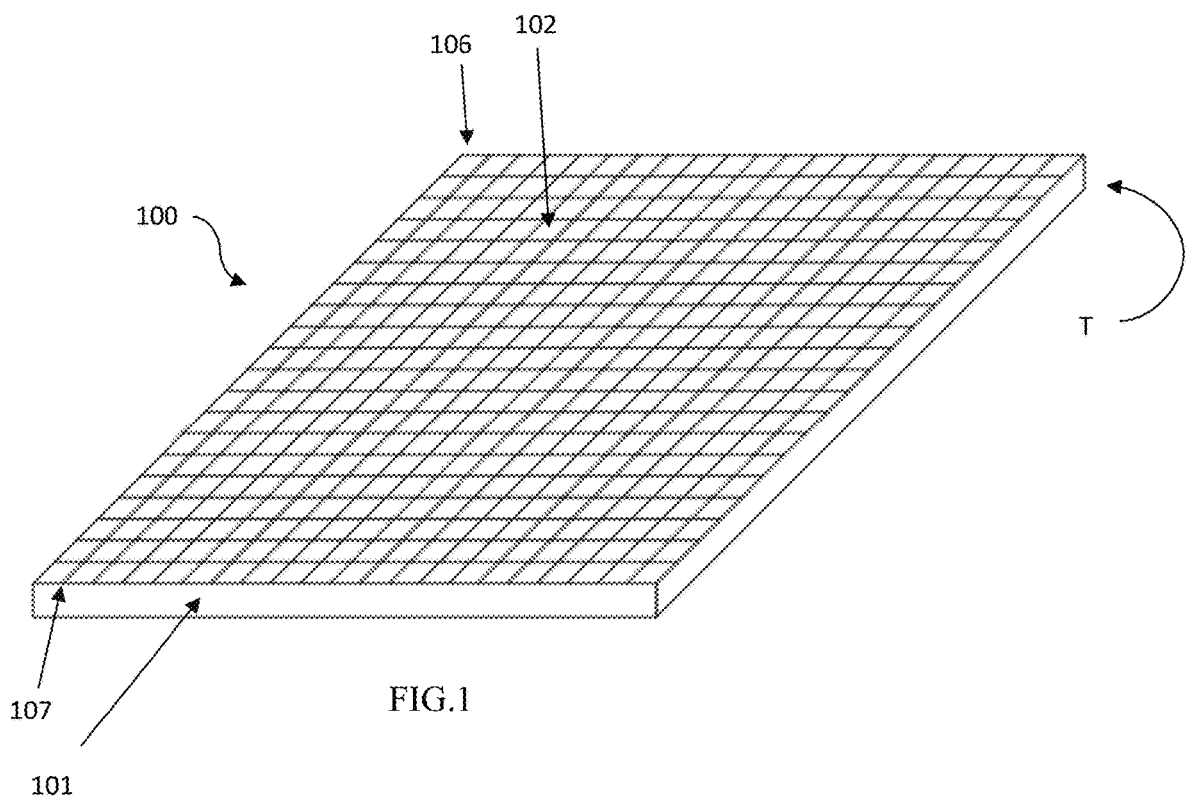
FIG. 1 depicts a representative sheet of fabric impregnated with a representative elastomeric material.

The materials used to make the invention are described. Referring to FIG. 1, a fabric 100 useable for the invention may be made from one or more types of woven, matted or meshed material, including, but not limited to, cotton, polyester, aramid (such as Kevlar®), coconut fibers, rayon, silk, fabric blends, carbon fibers or others. In a preferred embodiment, Kevlar® is the fabric 100. Fabric 100 may be manufactured in known commercial ways. Fabric 100 is impregnated with an elastomeric material 101 using one or more techniques known in the industry for affixing an elastomer to a fabric. Typically, the elastomeric material 101 is impregnated at a high density onto fabric 100. The elastomeric material 101 is heated under pressure to remove any air pockets or spaces. The combination of fabric 100 and elastomeric material 101 is referred to herein as seal base 102. Seal base 102, being the combination of fabric 100 and elastomeric material 101, has a thickness T, which thickness T is primarily the result of the affixed elastomeric material 101. As described below, one or more seal bases 102 are cut to shape and combined in a plurality of layers to form a seal. Typically, seal base 102 is wrapped on a mandrel and saw cut into strips 106 along cutting line 107. A range of types of elastomeric materials 101 may be used, including HNBR rubber.

As an object of the invention, seal base 102 makes use of the ability to stretch and compress the fabric 100 relative to the different ability to stretch and compress the elastomeric material 101.

Figure 2:
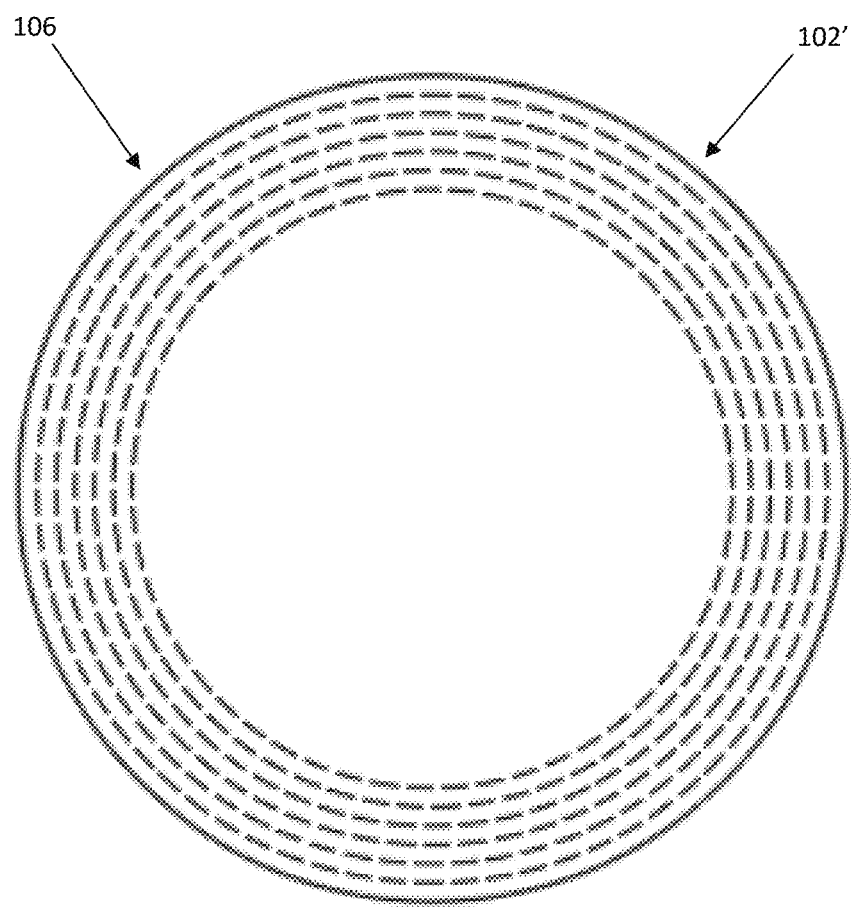
FIG. 2 depicts the representative sheet of fabric of FIG. 1 made and formed in the general round shape of a single layer of a ring-shaped seal described in this specification.

Seal base 102 may be made in a number of shapes, such as a sheet form as depicted in FIG. 1 or ring-shaped as depicted in FIG. 2. A ring-shaped seal base 102' may be made having a diameter approximately equal to the diameter of the groove into which it will be disposed. Ring-shaped seal base 102' must have a width wider than the width of the groove to be sealed and approximately the width of the seal to be made. Ring-shaped seal base 102' must have a diameter approximately equal to the diameter of a circular groove to be filled.

Preferably, seal base 102 may be cut into strips 106 having a width at least equal to the width of the seal to be made. As a further alternative, individual strips, such as strip 106 depicted in FIG. 1 and delineated by cutting line 107, may be cut from a seal base 102. Ring-shaped seal base 102' may be used as a strip 106. To form one type of seal which is the object of this disclosure, a plurality of strips 106 are bonded together using methods known in the industry, which may include heat, adhesives, pressure or a combination of methods. The number of strips 106 needed to make a seal depends on the thickness T of each strip 106. Thickness T depends on the type of fabric 100 and the type of elastomeric material 101 used. Additional types, sizes, properties and surface characteristics of the seal may vary based on specific needs in specific types of pipelines, but in general these are known in the industry. In some applications, 15 to 20 layers of strips 106 are bonded together in a stack or pile to make a seal. In other applications, as few as 5 layer or as many as 50 layers may be used. Other methods of forming a seal, such as winding a length of a single strip 106 over a form to create a radially stacked seal (as further described below) may be used. For clarity, while this disclosure identifies one or more methods for making the seal, this disclosure does not limit the methods by which to make such a seal.

Figure 3:
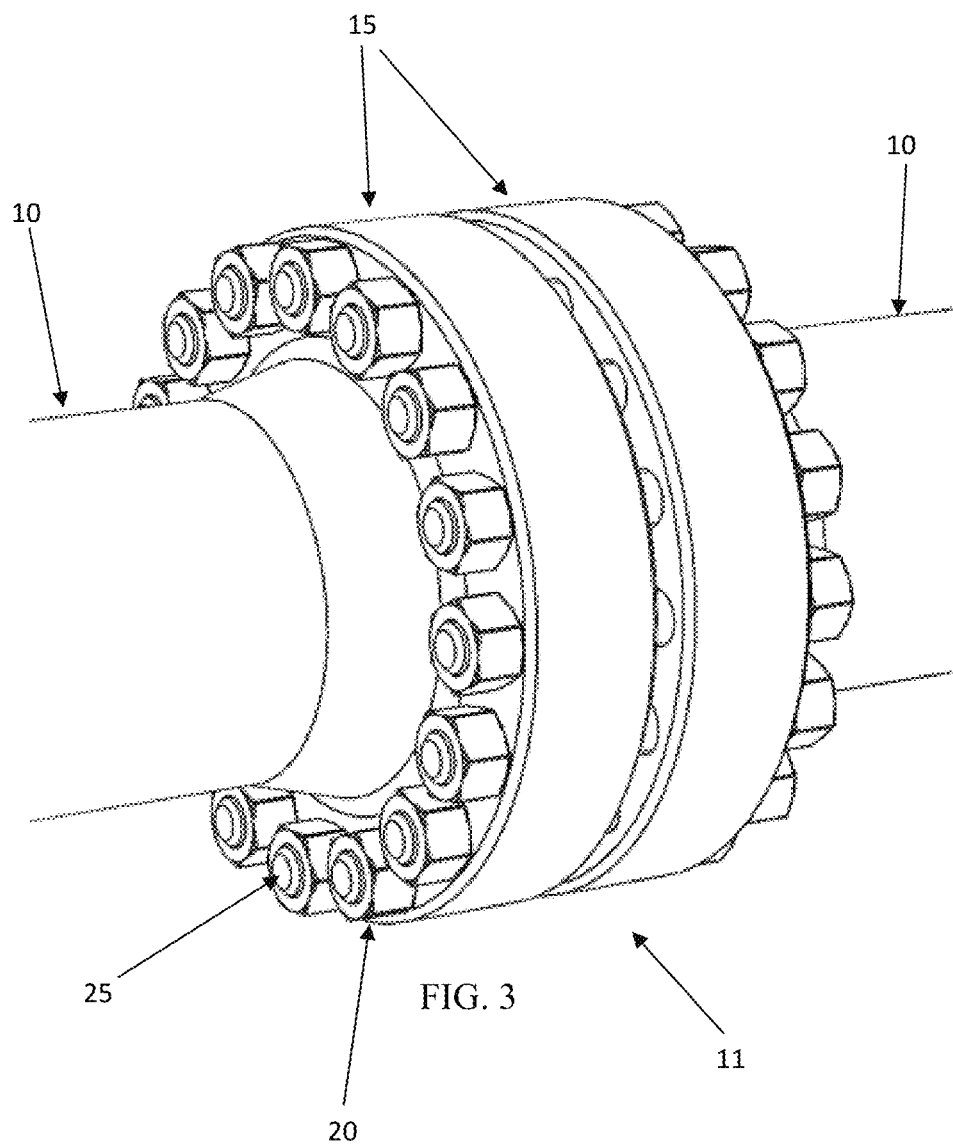
FIG. 3 depicts an isometric view of two known pipeline elements with the flanges bolted together.
Figure 4:
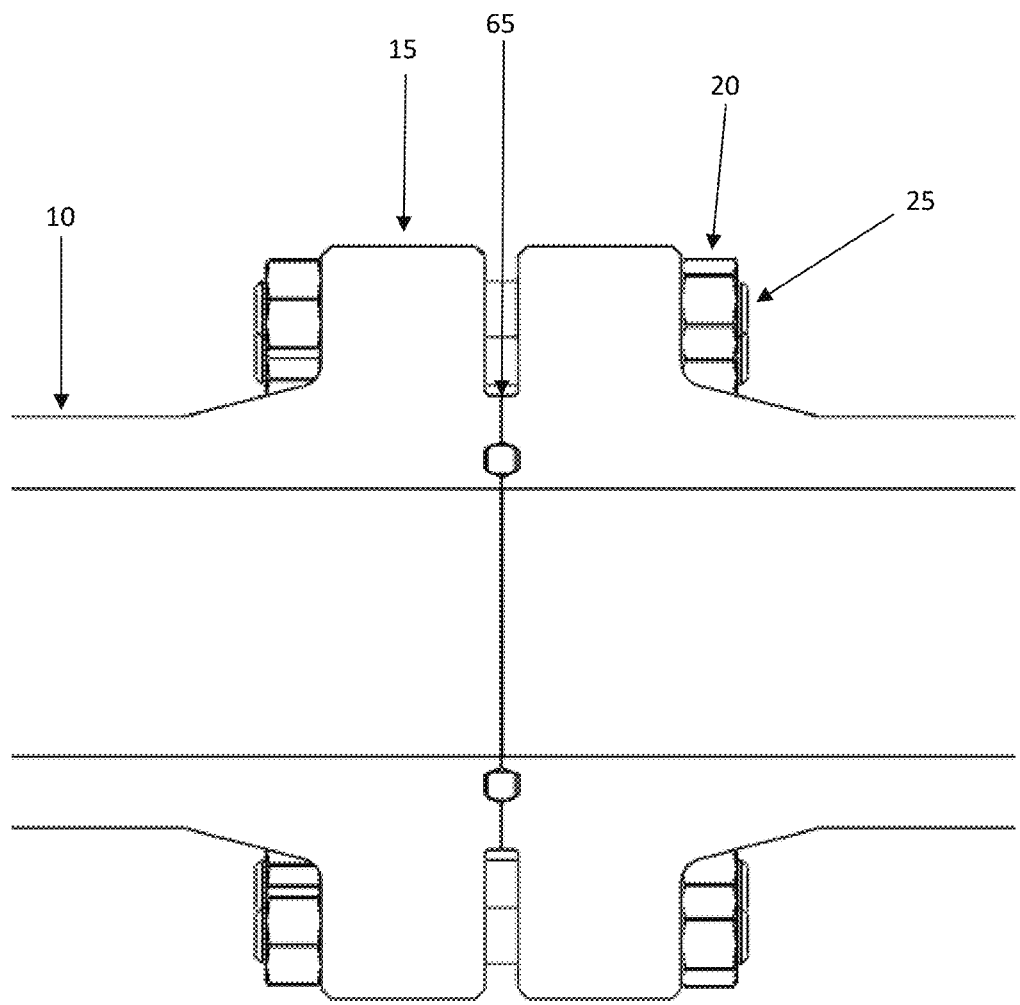
FIG. 4 depicts a cut-away side view of the pipeline elements of FIG. 3 further depicting the groove in the flat surface of each pipeline element with a known metallic seal disposed in the groove.

Referring next to FIG. 3 and FIG. 4 together, two pipeline elements 10 are depicted. Each pipeline element 10 has disposed at each end a connection end 11 suitable to connect one pipeline element 10 to another. Each pipeline element 10 comprises a flange 15 for making that connection. Flange 15 has disposed therein a plurality of bolt holes (not depicted). Two pipeline elements 10 are removably attached together by aligning the bolt holes of the flange 15 of one pipeline element 10 with the bolt holes of the flange 15 of the other pipeline element 10. The two pipeline elements 10 are bolted together by a worker using a plurality of nuts 20 and all threads 25. In other embodiments, a plurality of nuts 20 and bolts (not depicted) may be used to connect two pipeline elements 10. As depicted in FIG. 4, a joint 65 is created by the joining of two pipeline elements 10 together. Joint 65 runs across the surfaces of the two joined pipeline elements 10.

Figure 5:
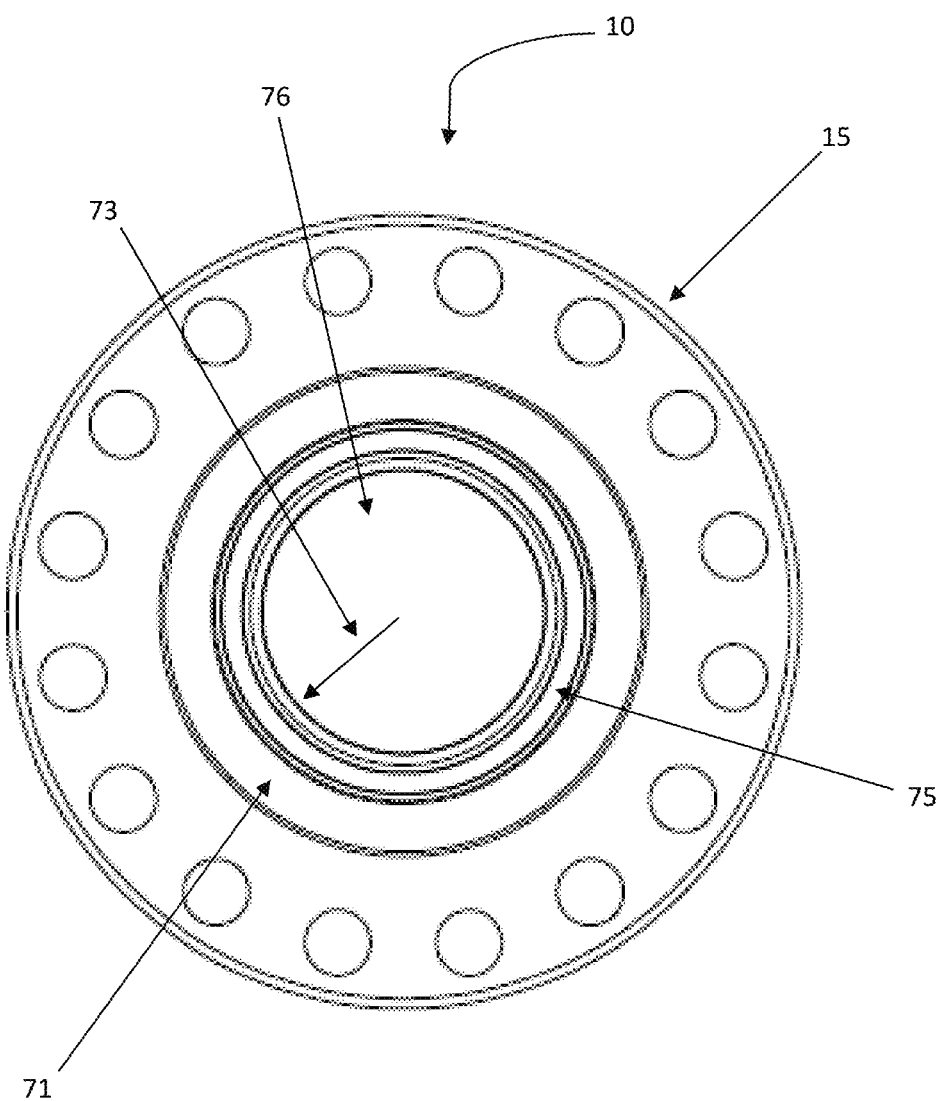
FIG. 5 depicts an end view of one pipeline element further depicting the groove therein.

Referring now to FIG. 5, each pipeline element 10 further comprises flange 15 and a face 71 suitable to be mated to the face 71 of a second pipeline element 10. Pipeline element 10 further comprises a conduit 76 for the passage of a fluid. Conduit 76 has a radius 73. Face 71 further comprises a groove 75 disposed concentrically around conduit 76. Groove 75 is sized, shaped and configured to receive a seal for sealing the connection between two connected pipeline elements 10. Walls 81 and bottom 82 of groove 75 are described below.

Figure 6A:
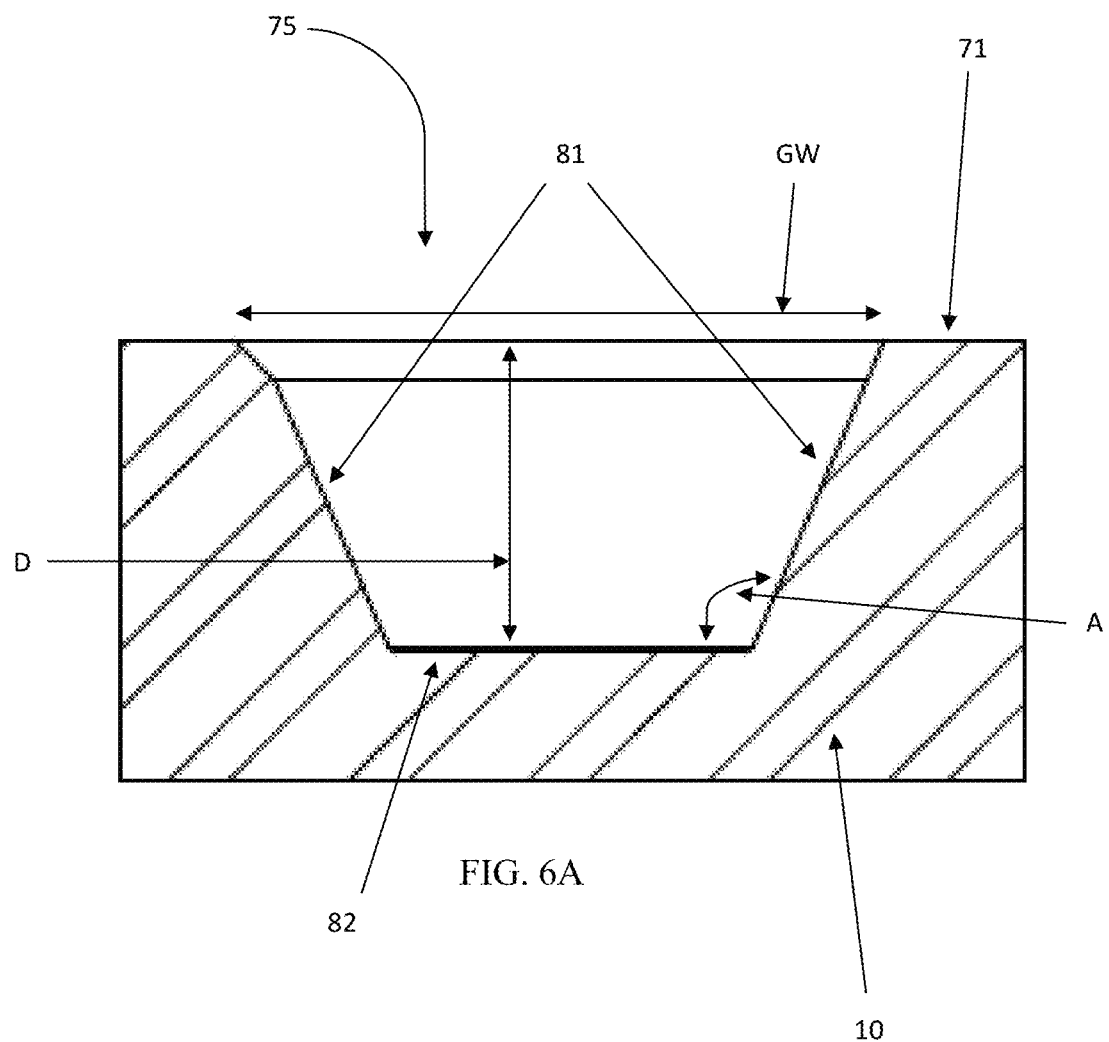
FIG. 6A depicts a cut-away side view of a standard API groove in a pipeline element.
Figure 6B:
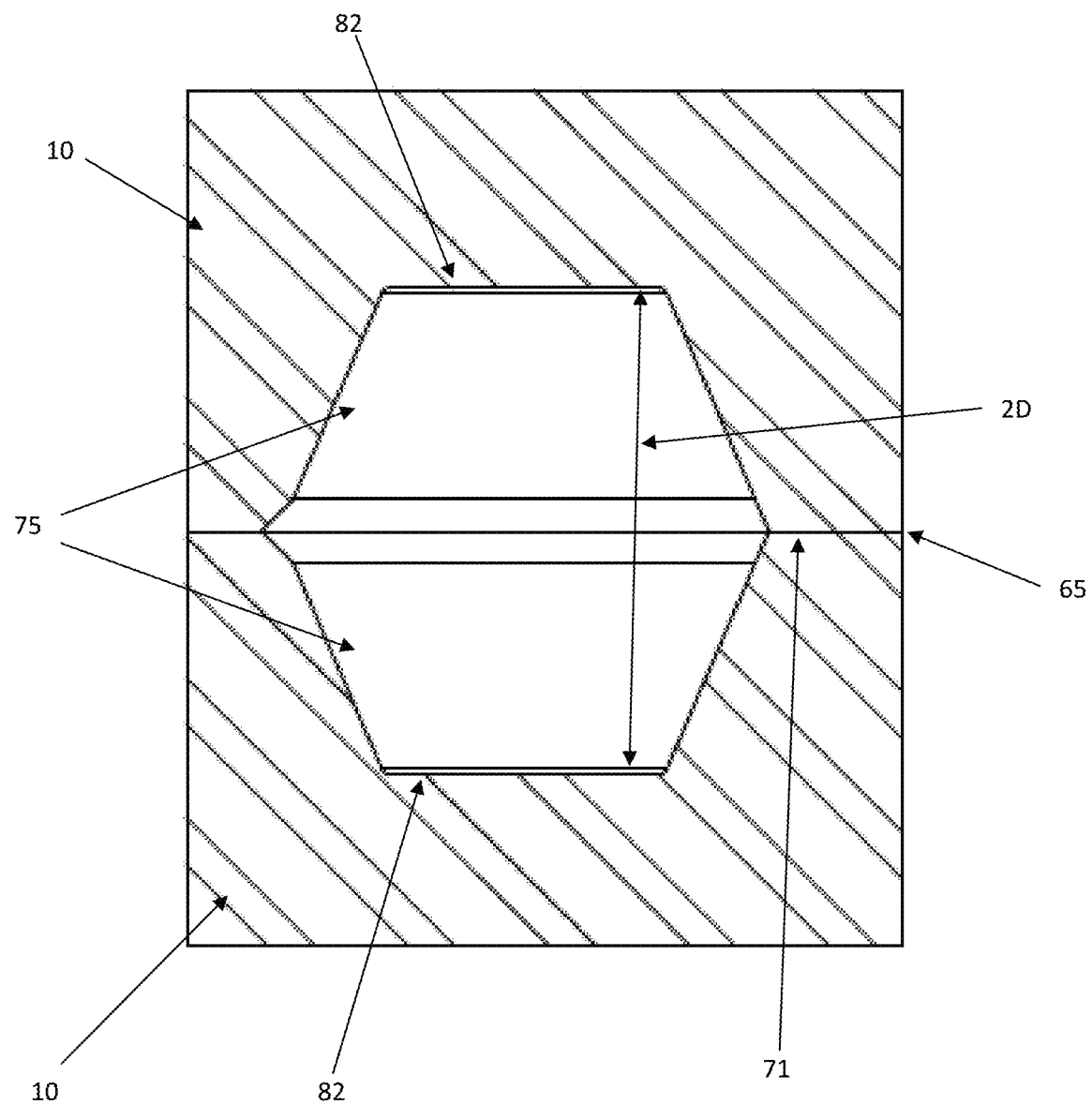
FIG. 6B depicts two standard API grooves, each disposed in a pipeline element, joined together.

Referring also to FIG. 6A, a cut away side view of an exemplary groove 75 is shown disposed in the face 71 of a representative pipeline element 10. The design of groove 75 is typically compliant with standards set by the API for pipeline element sealing grooves. This disclosure describes an API-compliant seal for convenience, but other forms or shapes of grooves may be the basis for the seals of this disclosure. For the purposes of example, groove 75 is comprised of two walls 81 and a bottom 82. The angle between each wall 81 and bottom 82 is an angle A, which is typically greater than 90 degrees, in accordance with API standards. Groove 75 has a depth D and a groove width GW as measured from the points where one wall 81 meets face 71 across groove 75 to the point where other wall 81 meets face 71. Referring to FIG. 6B, two pipeline elements 10 are depicted as assembled. Two grooves 75 are depicted aligned. When so aligned, the two grooves 75 have a combined depth of 2D (that is, the distance from the bottom 82 of one groove 75 to the bottom 82 of the adjoining groove 75). When the two pipeline elements 10 are so aligned and connected, joint 65 is created. Although two faces 71 when connected minimize the gap created in a joint 65, a seal is needed to prevent leakage from to connected pipeline elements 10.

Figure 7:
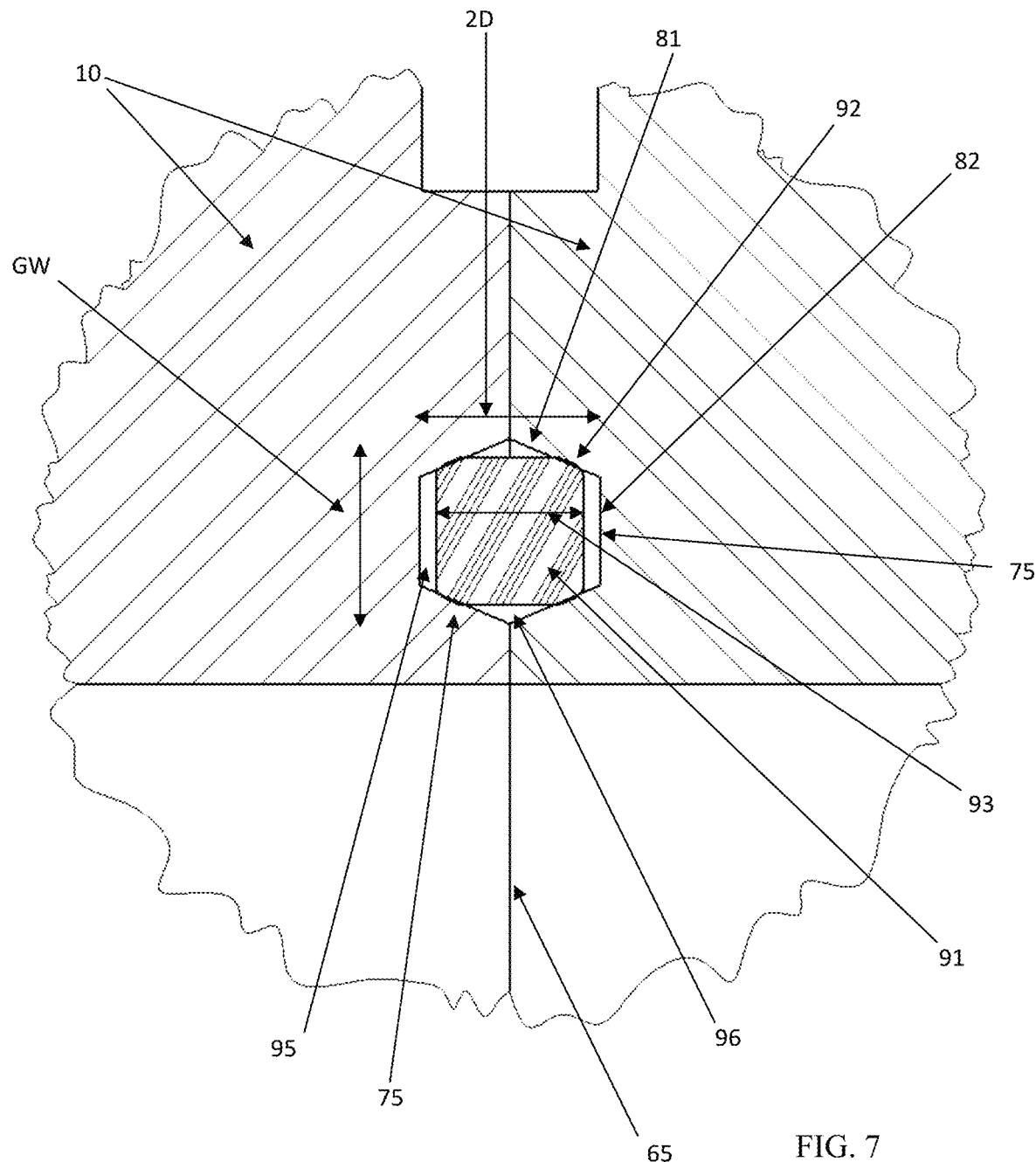
FIG. 7 depicts a cut-away side view of a known metal seal disposed in a pair of grooves and further depicting compression zones between the corners of the seal and the sides of the grooves as well as details of the design of each groove.

Many efforts have been made to create a reliable seal which is both easy to install and remove while, ideally, being reusable. Referring now to FIG. 7, an embodiment of the type of known metal seal used prior to the present invention is depicted. Therein, each groove 75 takes the shape of half an irregular hexagon so that when two pipeline elements 10 are joined together, two grooves 75 together take the shape of an irregular hexagon, with the length of bottom 82 and the length of walls 81 set by API standards when an API-compliant groove is used. As described above, two grooves 75 together have a width GW and a total depth of 2D. As depicted in FIG. 7, a form of metal seal 91 known in the industry is disposed in the two grooves 75. Metal seal 91 has a cross-sectional shape described generally as square with four rounded corners 92 (or similar shaped corners having localized contact with the walls of the grooves 75). Reference to "rounded corners" 92 may equally refer to similar variations of such corners. The size and square shape of metal seal 91 in the hexagon of grooves 75 results in each rounded corner 92 of metal seal 91 being disposed against each of the four walls 81 of two joined grooves 75. However, a bottom space 95 is allowed between each bottom 82 of the two grooves 75 and metal seal 91 when in position. As can be seen in FIG. 7, the height 93 of metal seal 91 is slightly larger than the distance between the contact points of two corners of metal seal 91 against walls 81 such that the two pipeline elements 10 cannot be pressed fully against each other without compressing and deforming seal 91. FIG. 7 depicts the size of metal seal 91 compared to the size of groove 75 by showing the extent to which rounded corners 92 would project into walls 81 if not for compression of the metal seal 91. Tightening the two pipeline elements 10 together thus deforms each of the rounded corners 92 of metal seal 91 sufficiently to form a seal to prevent leakage into joint 65. Similarly, a joint space 96 is created between each joint 65 of the pipeline elements 10 and the sides of seal 91. Bottom spaces 95 and joint spaces 96 permit metal seal 91 to be deformed during compression to create a complete seal. Compression occurs when walls 81 deform the corners 92 of seal 91 when pipeline elements 10 are joined tightly.

Referring still to FIG. 7, the size of metal seal 91 relative to the two joined grooves 75 is depicted. Metal seal 91 is shown disposed in the two grooves 75 in its actual, uncompressed size relative to the two grooves 75. As described above, FIG. 7 depicts each corner 92 extending into and through walls 81 of two grooves 75. Metal seal 91 is made from a metal more malleable than the metal from which each pipeline element 10 is made. Under compression, is it intended that the metal seal 91 will deform. The size difference of metal seal 91 along with the malleability of the metal together create the compressive seal when the pipeline elements 10 are joined.

Figure 12:
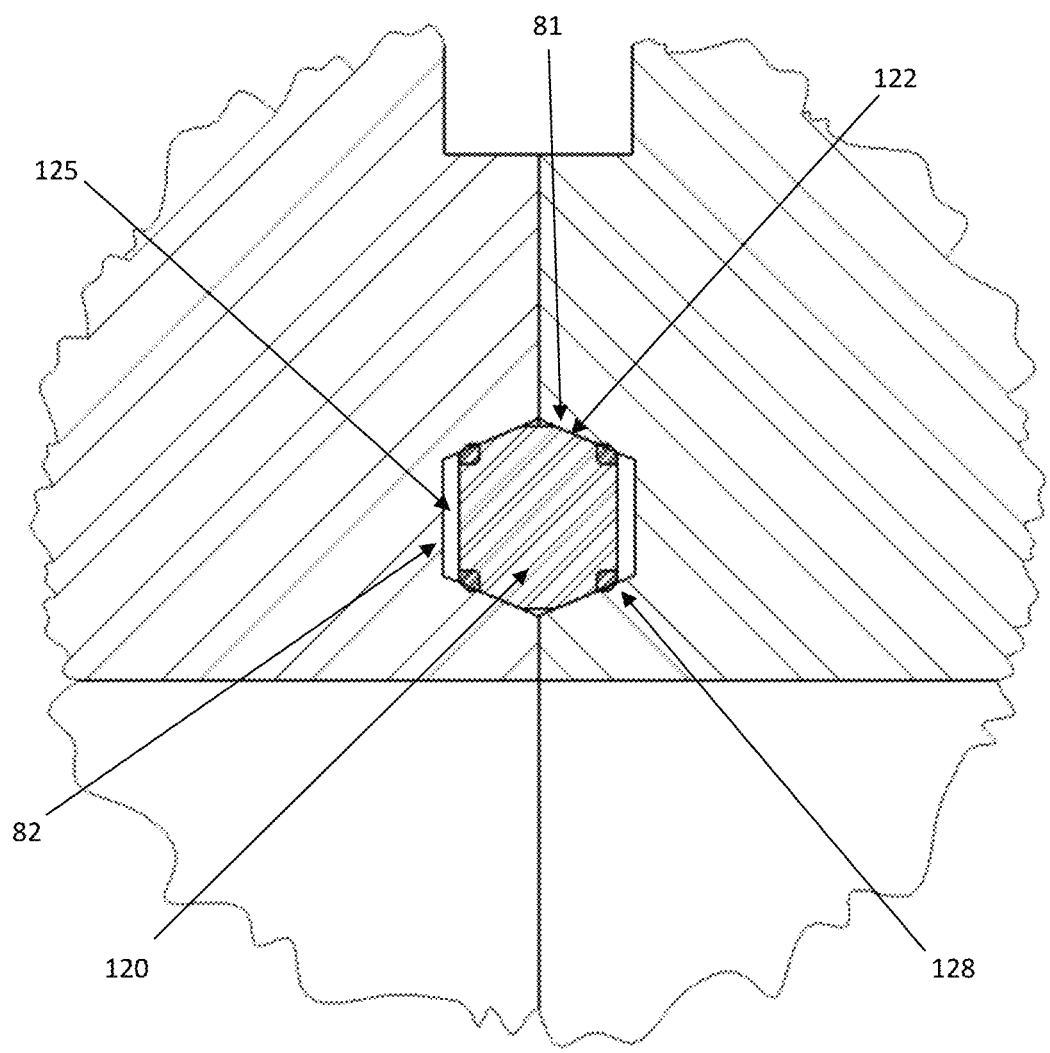
FIG. 12 depicts a cut-away side view of a known metal seal as depicted in FIG. 7 but with a plurality of resilient materials disposed on the metal seal.

Referring now to FIG. 12, an alternative, hexagonal metal seal 120 is disposed in grooves 75. Hexagonal metal seal 120 has four walls 122. Each wall 122 is disposed against one of the four walls 81 of grooves 75. A space 125 is allowed between hexagonal metal seal 120 and each groove bottom 82. Further, hexagonal metal seal 120 has disposed thereon and affixed thereto four elastomeric bands 128 positioned as depicted to make contact with each of four walls 81 to create a seal under compression. Elastomeric bands 128 are sized so that alternative, hexagonal seal 120 with the elastomeric bands 128 in position are together slightly larger than the size of the grooves 75 such that elastomeric bands 128 are the source of sealing compression.

Each of FIG. 7 and FIG. 12 depicts the size of each disclosed metal seal 91 and alternative, hexagonal metal seal 120 in grooves 75 by depicting each metal seal 91 and alternative, hexagonal metal seal 120 as slightly larger than grooves 75.

Figure 8:
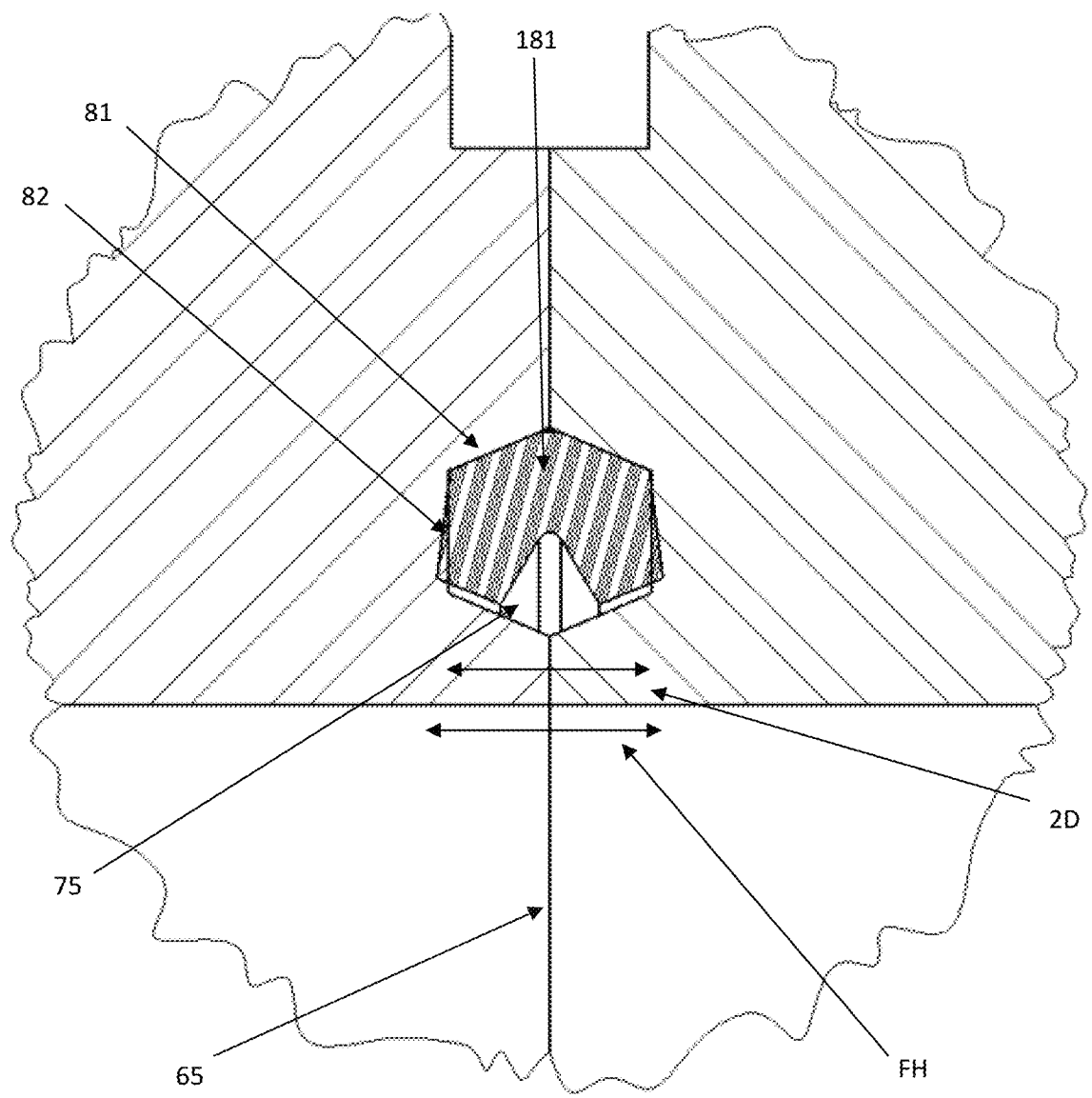
FIG. 8 depicts a cut-away side view of a known elastomeric seal having a cupped shape.

Referring to FIG. 8, another alternative seal, a V-shaped resilient seal 181, is depicted. V-shaped resilient seal 181 has a full height FH slightly larger than the combined 2D depth of two grooves 75. This is depicted in FIG. 8, which shows V-shaped resilient seal 181 in its uncompressed form wider than two grooves 75. Strut 185 is sized such that upon compression strut 185 is pressed against the walls 81 of grooves 75.

Figure 13:
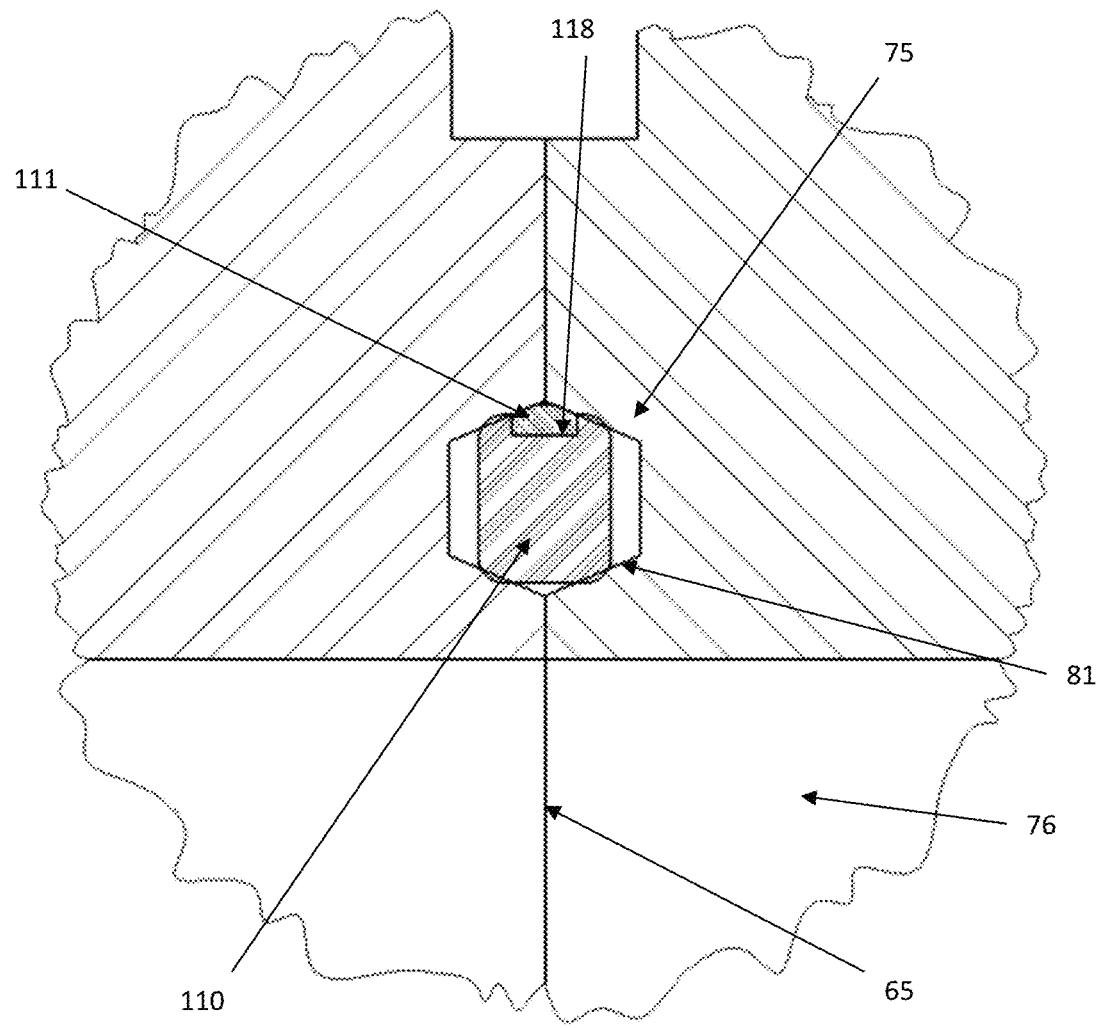
FIG. 13 depicts a cut-away side view of a known metal seal as depicted in FIG. 7 with a plastic or metallic material affixed.

Referring now to FIG. 13, a further combination metal-elastomeric seal 110 is depicted. Metal-elastomeric seal 110 has approximately the same shape as metal seal 91 depicted in FIG. 7 but further comprises a seal groove 118 cut or otherwise formed in the outer circumference of metal-elastomeric seal 110. In this context, "outer" refers to the cross-sectional radial direction away from conduit 76 and toward the exterior of the pipeline element 10; that is, in the direction in which leakage protection is needed. Elastomeric band 111 is disposed into seal groove 118 along the entire circumference of the metal-elastomeric seal 110. As with metal seal 101, metal-elastomeric seal 110 and elastomeric band 111 are designed to be slightly larger than the groove 75 into which they are to fit. As with metal seal 101, when pipeline elements 10 are joined together, the four corners of metal-elastomeric seal 110 are compressed and deformed into walls 81 of grooves 75, forming a seal. Elastomeric band 111 is also designed to be slightly larger than the region of the grooves 75 into which it is disposed. When pipeline elements 10 are joined, elastomeric band 111 provides anti-extrusion protection of the metal-elastomeric seal 110 into joint 65.

While these examples of prior art show a range of efforts to create sufficient seals in connected pipeline elements 10, these examples equally show the limitations of working with metal bands as seals. Any metal seal with an exposed metal element creates a risk of damage to the face 71 and/or groove 75 of a pipeline element 10 during the installation or removal of a seal. In each case with a metal seal, it is necessary to deform the metal element of the seal through the compression of two pipeline elements 10 against each other. The chance of damage to the face 71 or groove 75 is increased during removal, since the old seal must typically be pried from the groove 75. The use of elastomers with metal is limited in its ability to obviate the limitations of various metal seals described here. For example, an elastomer has the potential to be extruded in a joint 65 during installation, reducing the effectiveness of the seal.

Figure 9:
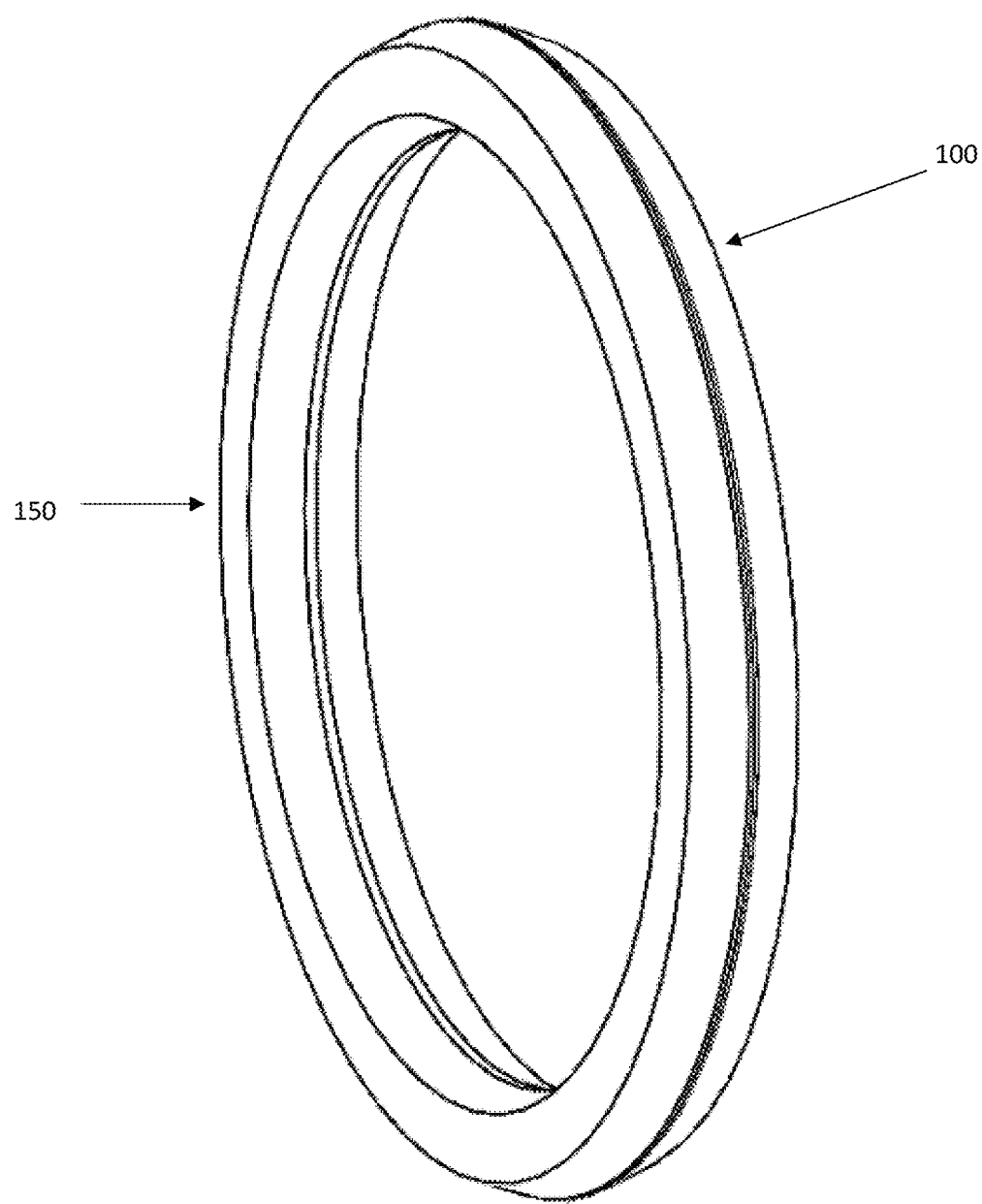
FIG. 9 depicts an isometric view of the preferred embodiment of the invention disclosed herein.
Figure 14:
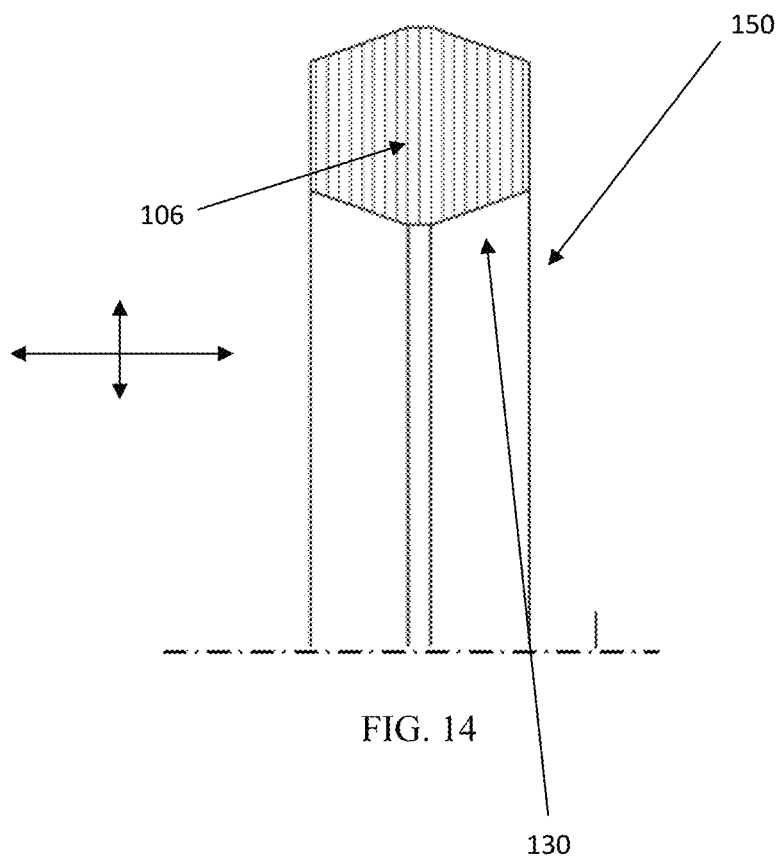
FIG. 14 depicts a cut-away view of the seal depicted in FIG. 9 in which strips of elastomer impregnated fabric are axially stacked to form a seal.
Figure 15:
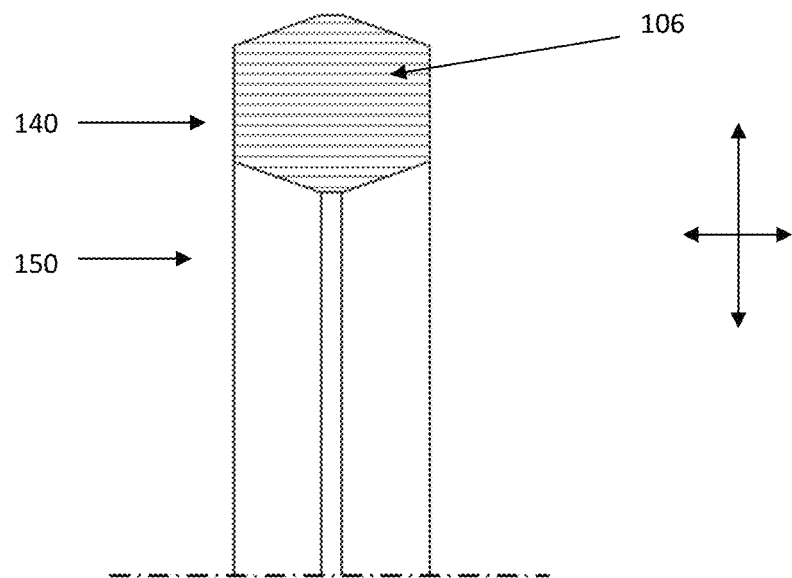
FIG. 15 depicts a cut-away view of the seal depicted in FIG. 9 in which strips of elastomer impregnated fabric are radially stacked to form a seal.

Referring now to FIG. 9, FIG. 10, FIG. 14, and FIG. 15, the invention 150 is described. As depicted in FIG. 14 and FIG. 15, invention 150 comprises an assembly of strips 106 or 102' bonded together and then sized and shaped to fit under compression into two grooves 75. The elastomeric material permits reliable compression while the fabric material controls the ability of the elastomeric material to expand in an undesired direction when compressed in a desired direction. Referring to FIG. 1 and FIG. 2, the plurality of strips 106 previously described (linear strip or circular strip) are assembled in a stack and bonded in the form of a seal 150, as depicted in FIG. 9. After stacking and bonding, seal 150 is cut and trimmed to a specific size and shape as depicted in a preferred embodiment in FIG. 9, FIG. 10, and FIG. 14 or FIG. 15. Referring specifically to FIG. 14 and FIG. 15, stacked strips 106 or 102' may be oriented parallel to a radius extending from the center of a pipeline element 10 (FIG. 14) or parallel to an imaginary axial center of a pipeline element 10 (FIG. 15). These are referred to as the Axial Stack Seal 130 in FIG. 14 and Radial Stack Seal 140 in FIG. 15. Fabric 100 within each strip 106 limits stretching along the width of each strip but allows compression. The elastomeric particles 101 may be compressed or stretched in any direction. As a result, Axial Stack Seal 130 and Radial Stack Seal 140 have different distinct functional characteristics based upon the orientation in which they are used. Representative arrows showing differences in stretching are depicted in FIG. 14 and FIG. 15. Similar differences in compression are identified but not depicted. The arrows as to stretching in FIG. 14 and FIG. 15 are representative only. In a preferred embodiment, Kevlar® is used as fabric 100. Kevlar® tends to limit both compression and stretching in a desired fashion.

In a standard Axial Stack Seal 130 or Radial Stack Seal 140, a plurality of strips 106 or 102' numbering between 15 and 20 layers are used to form a seal. In a preferred embodiment, 18 to 20 layers of strips 106 or 102' are used to form a seal. The invention 150 permits as few as 5 layers or 50 or more layers.

Figure 10:
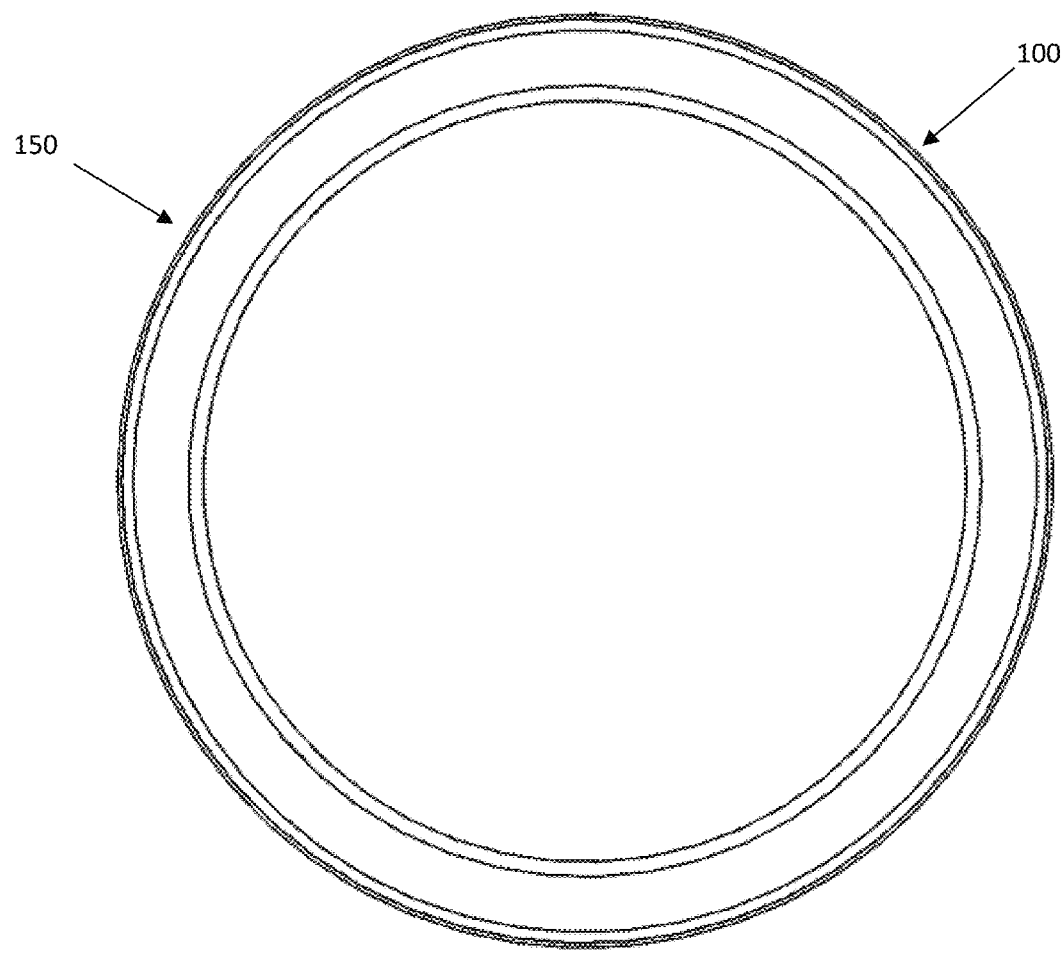
FIG. 10 depicts a side view of the preferred embodiment of the invention herein.

Referring still to FIG. 9 and FIG. 10, and referring further to FIG. 14 and FIG. 15, representative embodiments of the invention 150 is depicted.

In a preferred embodiment, at least one layer of fabric 100, as described as in FIG. 1 but with no elastomers impregnated thereon, is adhered on the outer surface of the invention 150. The at least one layer of fabric 100 is used to reduce further the likelihood of extrusion of elastomeric material 101 into the joint 65 between two connected pipeline elements 10. The number of layers of fabric 100 adhered to the surface of the invention 150 may depend on the type of elastomeric material 101 used in the invention 150.

Figure 11:
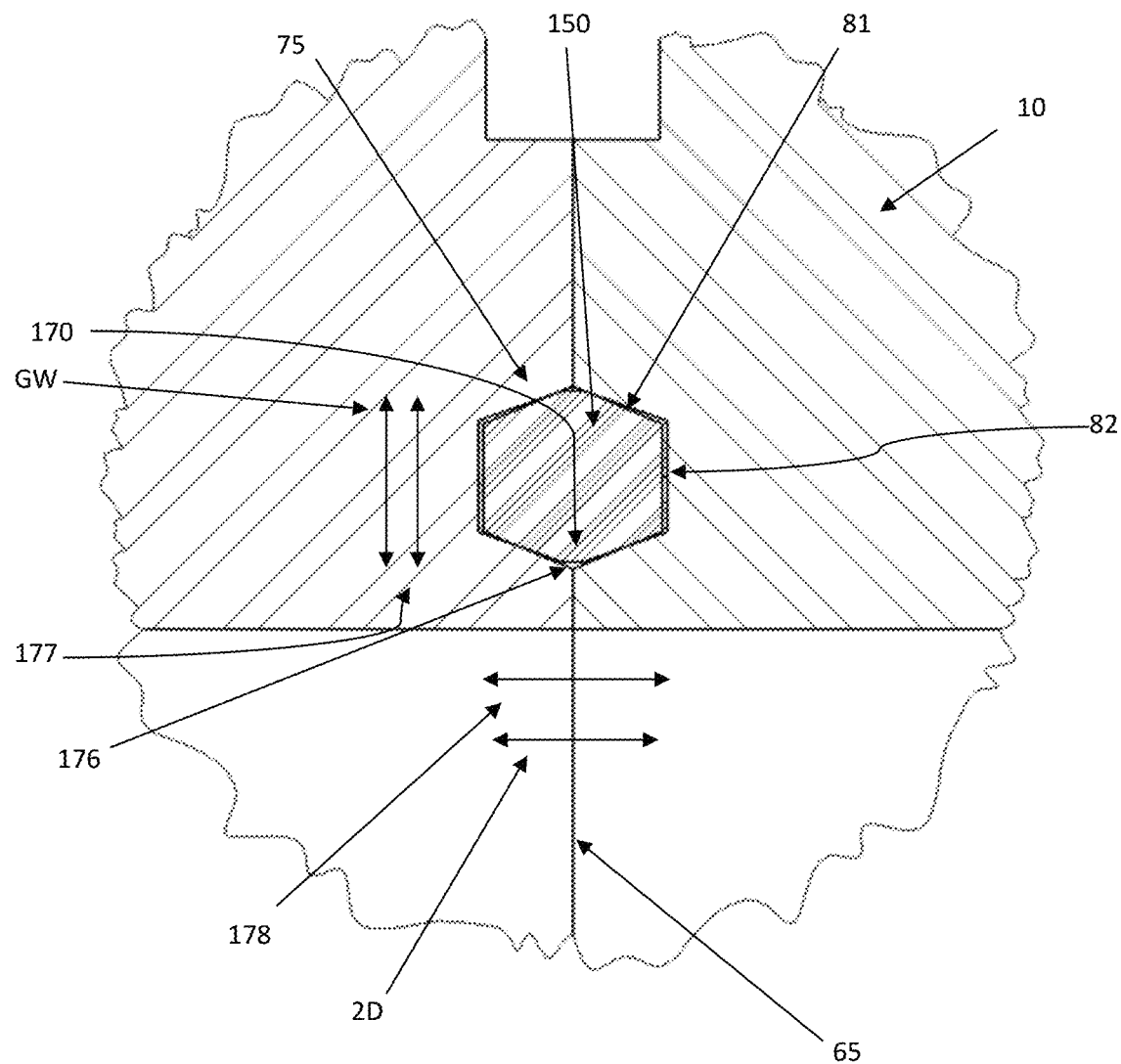
FIG. 11 depicts a cut-away side view of the preferred embodiment of the elastomeric seal described in this disclosure with two grooves to show the oversize of the elastomeric seal.

Referring also to FIG. 11, and with reference to the dimensions as to groove width GW and depth D of groove 75 as depicted in FIG. 6A and FIG. 6B, the preferred embodiment of the invention 150 is depicted in cross-section to show the cross-sectional area of seal 150 relative to the cross-sectional area of two joined grooves 75 between two pipeline elements 10. Likewise, FIG. 11 depicts the groove width GW and total depth 2D of two grooves 75 relative to invention width 177 and invention depth 178. The bulk modulus of the elastomers of the invention 150 is known. Thus, the compressibility of the invention 150 is calculated into sizing the invention 150 relative to the size of two grooves 75. The cross-sectional area of invention 150 is generally up to approximately 10% larger (and in some cases up to 20% larger) than the combined cross-sectional area of two grooves 75. Thus, the invention 150 will be under some form and level of compression when disposed in two grooves 75. In order to impose the desired compression, the invention width 177 is the same size or slightly smaller than the groove width GW of groove 75, as described in FIG. 6A and the invention depth 178 is slightly larger than twice the depth of two grooves 75, as also described in FIG. 6A. As depicted in FIG. 11, not accounting for compression, invention 150 extends past the walls 81 and bottoms 82 of groove 75. When invention 150 is positioned in two grooves 75, it is immediately compressed against walls 81 and bottoms 82.

A flat surface 170 is cut or formed onto each side of the invention 150 positioned proximately to the joint 65 during use. Each flat surface 170 results in a joint gap 176 proximate to each joint 65. Under compression, flat surface 170 is pressed into joint 65, thereby eliminating joint gap 176

Referring also to FIG. 14 and FIG. 15, the orientation of strips 106 or 102' in invention 150 relative to the ability to stretch or compress invention 150 is used as a factor in the cross-sectional size and cross-sectional area of invention 150 relative to the cross-sectional size and cross-sectional area of groove 75. For example, in a preferred embodiment, fabric 100 is Kevlar®. When Kevlar® is used, the invention width 177 and invention depth 178 of invention 150 are proportional to the groove width GW and combined depth 2D of two combined grooves 75. However, the Kevlar® seal is approximately 10% larger by volume than the volume of the grooves 75 so that the Kevlar® seal is compressed equally by walls 81 and bottoms 82 of grooves 75.

The use of oversized seals, such as a Kevlar® seal having a volume of approximately 10% larger than the total volume of grooves 75 in which the invention 150 is disposed is done in part to improve the sealing effect of invention 150 by the use of compression to force flat surface 170 against joint 65. The size of the invention 150 also serves to promote reusability of invention 150. Each use of invention 150 tends to cause some permanent compression of the elastomeric material 101 therein, slightly reducing the compressibility of invention 150 for a future use. Likewise, each use of invention results in some "nibbling" and other loss of material in the invention 150. The oversize of the invention 150 in its new condition allows effective re-use of the invention 150.

The invention 150 is reusable due to the nature of the resilient materials used in its construction. During pipeline maintenance of a known metal seal, such as metal seal 91, the compression on metal seal 91 deforms metal seal 91 into being pressed tightly against the walls 81 of the grooves 75. In order to remove metal seal 91 from a groove 75, metal seal 91 must be pried from at least one groove 75 using one or more metal tools able to pry between metal seal 91 and a wall 81 and bottom 82 of groove 75. Workers risk damaging the surfaces of walls 81, bottom 82 and face 71 while working to remove metal seal 91. Equally, the act of compressing metal seal 91 into two grooves 75 during installation may damage walls 81 or bottom 82. To the contrary, installation and removal of invention 150 cannot damage the metal surface for the reason that the pliant fabric 100 and elastomeric materials 101 comprising invention 150 cannot scar or scrape a metal surface. Removal of invention 150 may be accomplished by pinching and grabbing it with a worker's fingers or by prying it out with a flat object, such as a standard plastic putty knife.

All surfaces of groove 75, including walls 81 and bottom 82, are protected from exposure to corrosive flowing media by the present invention depicted in FIG. 9 to extend the life of the flanged pipeline element. Invention 150 is slightly larger than the volume of grooves 75. Under compression, invention 150 completely fills grooves 75. The counter pressure imposed by the compressed invention 150 prevents the intrusion of fluids into grooves 75.

Figure 16:
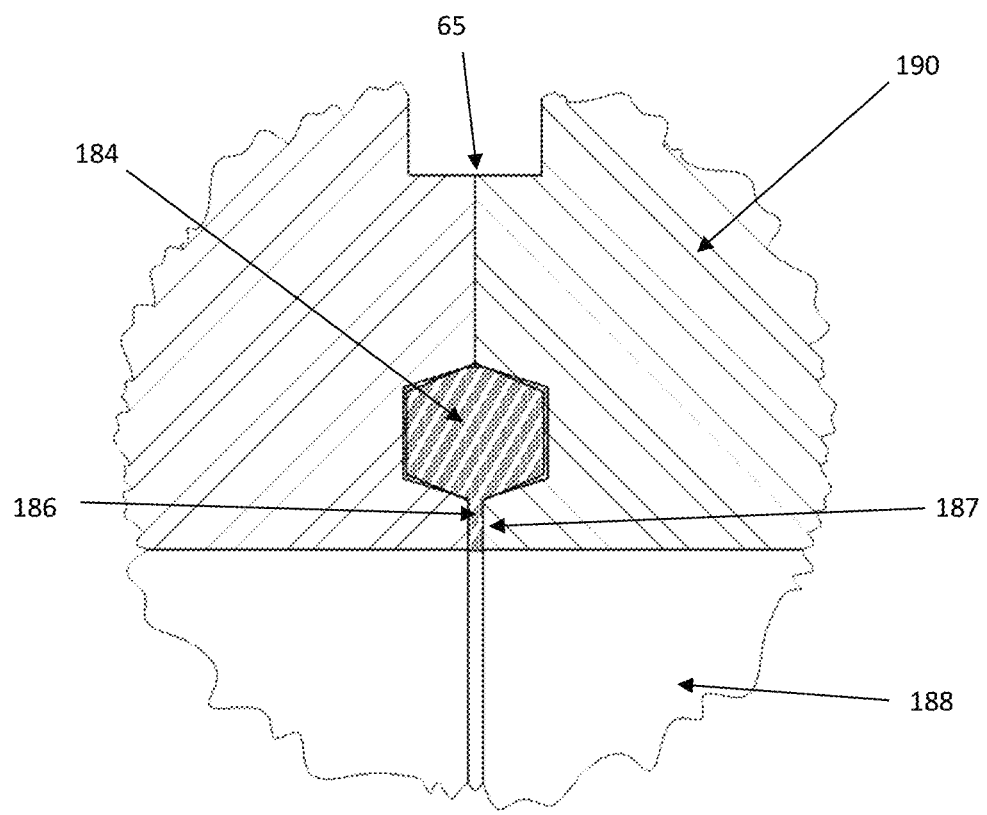
FIG. 16 depicts a cut-away side view of an alternative embodiment of the invention in FIG. 11 in which the seal further comprises an inside diameter strut and in which the groove of each pipeline element is modified to accommodate the strut of the seal.
Figure 17:
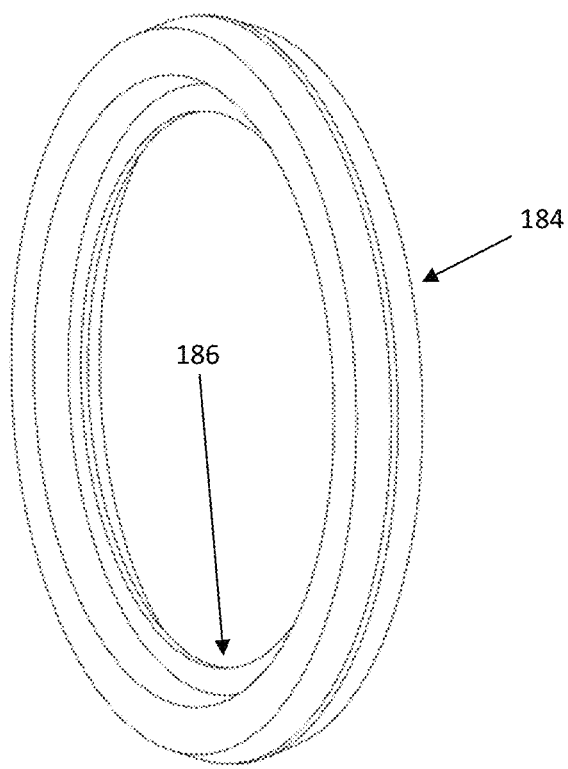
FIG. 17 depicts an isometric view of the alternative embodiment depicted in FIG. 16.
Figure 18:
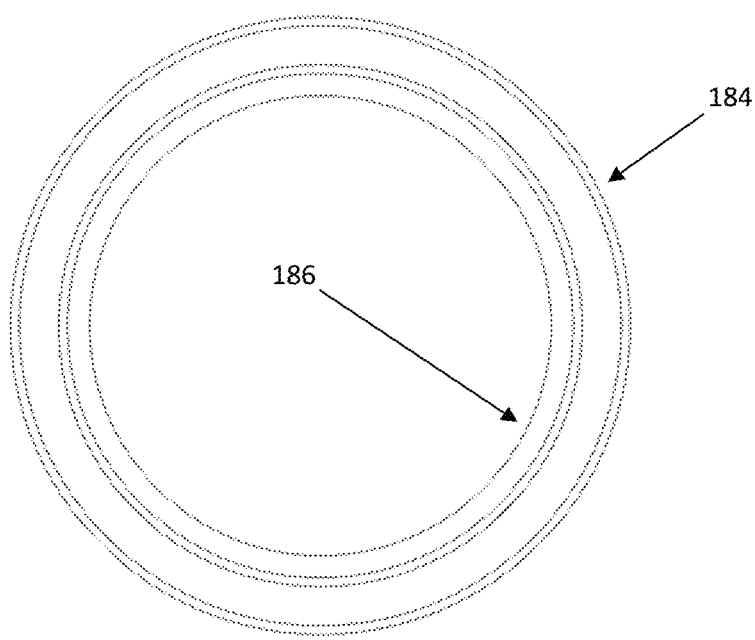
FIG. 18 depicts a side view of the alternative embodiment depicted in FIG. 16.

Referring now to FIG. 16, FIG. 17 and FIG. 18, an alternate embodiment of the invention is depicted. Therein, a seal 184 further comprises a strut 186 extending radially inward from the seal 184. As depicted best in FIG. 16, strut 186 is disposed in a channel 187 which connects grooves 75 to a conduit 188 in each pipeline element 10. Channel 187 has a width, which is slightly narrower than the width of strut 186. The difference in width between strut 186 and channel 187 is based upon the bulk modulus of the elastomers used to make seal 184. Seal 184 is used in a modified pipeline element 190, which is modified from pipeline conduit 10 to include one half of channel 186. When seal 184 with strut 186 are used to seal two modified pipeline elements 190, the compression of strut 186 within channel 187 helps to prevent or minimize seepage of liquids transported in the pipeline into grooves 75. That is, strut 186 adds an additional level of sealing to seal 184 by preventing or limiting seepage into joint 65. Seal 184 is constructed from strips 106 or 102' in the same manner as invention 150.

The limitation of this embodiment is that it requires a non-API compliant groove 75. Either a non-API compliant pipeline element must be obtained for use with seal 184 or an API compliant pipeline element must be modified to cut or otherwise dispose a channel 186 into the pipeline conduit.

Figure 19:
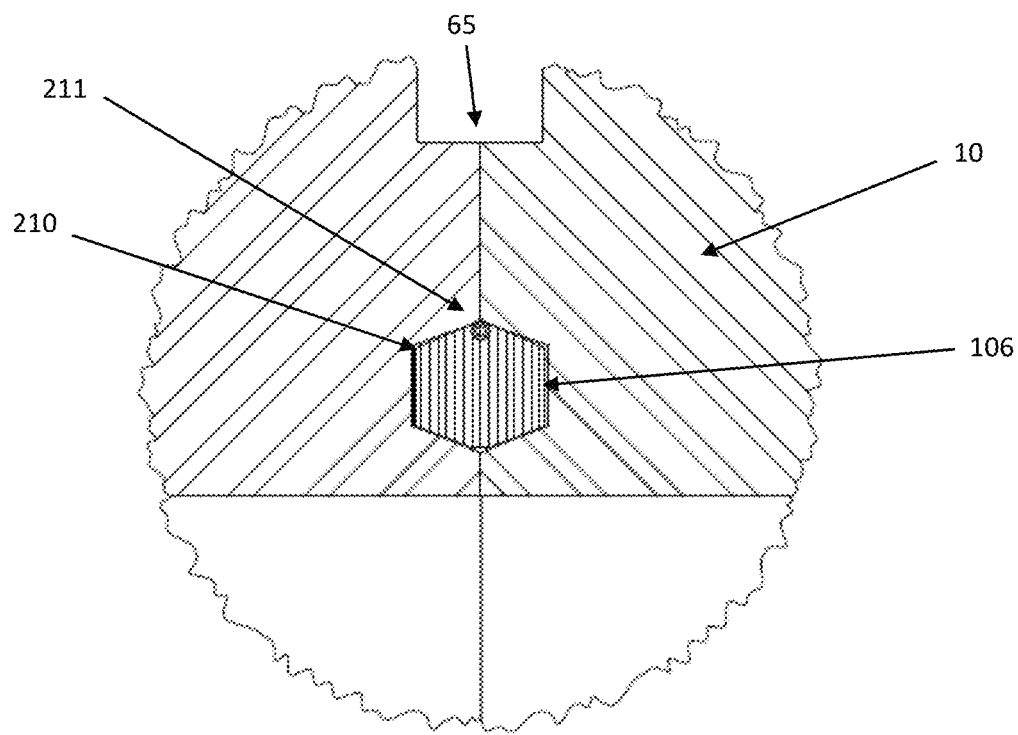
FIG. 19 depicts a cut-away side view of the elastomeric seal in which a coiled spring is disposed therein to prevent extrusion.
Figure 20:
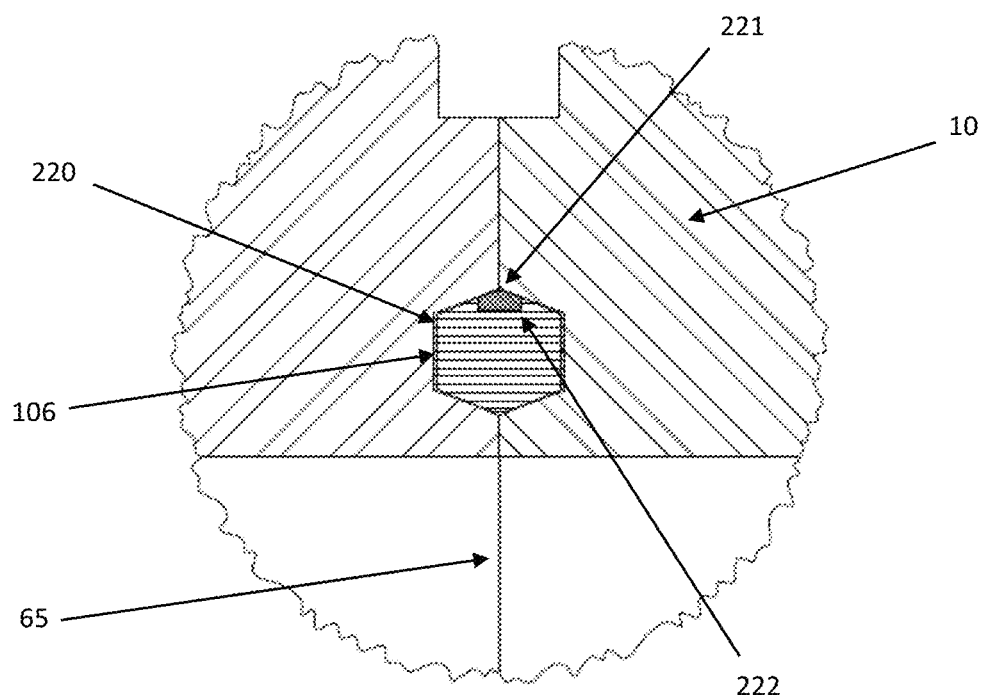
FIG. 20 depicts a cut-away side view of the elastomeric seal in which a plastic or metallic material is affixed thereto to prevent extrusion.

Referring now to FIG. 19 and FIG. 20, additional alternative embodiments of the invention are depicted. FIG. 19 depicts a seal 210 as generally described herein as invention 150 but with a coiled spring 211 disposed in seal 210 in a position radially outward from the inward direction of a pipeline element 10. Coiled spring 211 has disposed over it a thin elastomeric coating. Coiled spring 211 replaces one flat surface 170 in invention 150. Under compression between two pipeline elements 10, coiled spring 211 is pressed toward joint 65 to provide a seal to improve the functioning of seal 210. Seal 210 is reusable to approximately the same extent as invention 150. As depicted in FIG. 14 and FIG. 15, strips 106 may be assembled to form a Radial Stack Seal 140 or an Axial Stack Seal 130 of invention 150. The orientation of strips 106 is previously described herein. In FIG. 19, an axial stack of strips 106 is depicted, although a radial stack of strips 106 is equally permitted.

Similarly, FIG. 20 depicts a seal 220 comprising a channel 222 into which a plastic or metal band 221 is disposed. Band 222 may be adhered into channel 222 or may simply sit removeably in channel 222. In use, band 221 is pressed against a joint 65 between two pipeline elements 10 in the same manner as the coiled spring 211 depicted in FIG. 19. Pressure from the compression of seal 220 presses band 221 against joint 65 to promote sealing of the connected pipeline elements 10. Seal 220 may be reused in the same manner as invention 150 although band 222 may be replaced from time to time. The material from which band 222 is made may depend primarily on the composition and size of seal 220. Any suitable metal or plastic material may be used. In FIG. 20, a radial stack of strips 106 is depicted, although an axial stack of strips 106 is equally permitted.

Figure 21A:
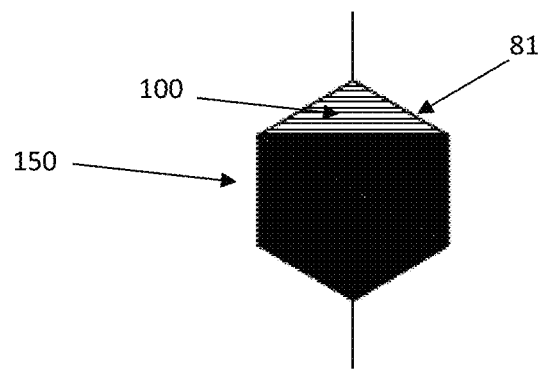
FIG. 21A depicts a cut-away view of an alternative embodiment of the elastomeric seal of FIG. 11 with a layer of fabric disposed only on a portion of the outer diameter part of the seal.
Figure 21B:
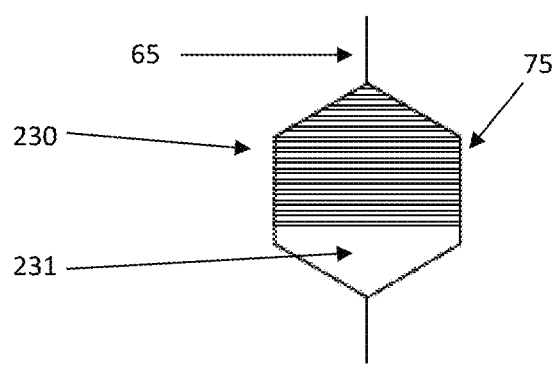
FIG. 21B depicts a cut-away vide of an alternative embodiment of the elastomeric seal of FIG. 11 with a fabric fill in which the seal does not fill 100% of the grooves.
Figure 21C:
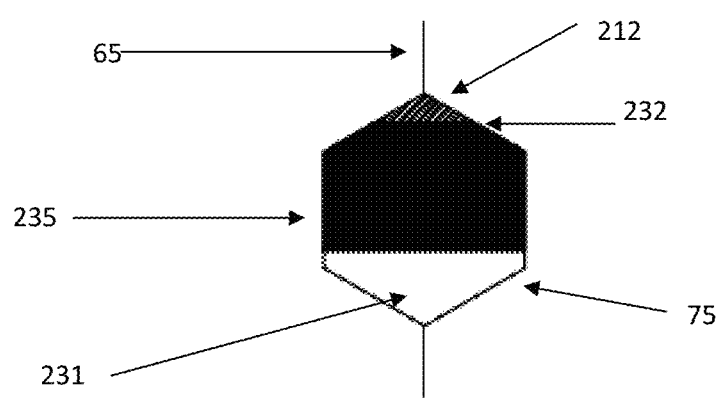
FIG. 21C depicts a cut-away view of an alternative embodiment of the elastomeric seal of FIG. 18 in which the seal does not fill 100% of the grooves.

Referring to FIG. 21A, FIG. 21B, and FIG. 21C, additional alternative embodiments of the invention are depicted. Referring first to FIG. 21A a layer off fabric 100 is disposed on the surface of invention 150 on sides 81 and flat surface 170 in the outward radial direction of invention 150. Fabric 100 is not disposed on the remainder of invention 150.

Referring to FIG. 21B, an alternative seal 230 filling only half or slightly more than half of the grooves 75 in the outer diameter portion of grooves 75 is depicted to seal joint 65. A void 231 is allowed to remain unfilled.

Referring now to FIG. 21C, an alternative seal 235 is depicted. Alternative seal 235 takes generally the shape and size of alternative seal 230, including a void 231. On this alternative seal 235 a flat surface 232 is disposed proximate to the joint 65 in the outward radial direction of grooves 75 on which is disposed a metal or plastic ring 212 which is pressed against the outer radial direction of joint 65 to reduce the 'risk of seepage.

We claim:
1. A sealed pipeline assembly comprising:
  a reusable seal in a sealing groove disposed in a joint formed between one connection end of a first pipeline element removeably connected to one connection end of a second pipeline element, wherein the reusable seal is made from a plurality of strips of fabric, wherein each strip of fabric has disposed thereon a heated and pressed elastomeric material to create a continuous layer of elastomeric material bonded to the strip of fabric, wherein each fabric and elastomer strip has a width and a thickness, and wherein the plurality of the fabric and elastomer strips are stacked, bonded, shaped, sized, and cut into the reusable seal having an approximate shape of the sealing groove formed in the joint between the connection end of the first pipeline element and the connection end of the second pipeline element;

wherein the sealing groove formed in the joint of the connection end of the first pipeline element and the connection end of the second pipeline element comprises a first groove element disposed in the first pipeline element and a mirror-image second groove element disposed in the second pipeline element;

wherein the sealing groove in the joint has a generally hexagonal cross-sectional shape further comprising a width and a depth;

wherein the reusable seal has a generally hexagonal cross-sectional shape with a cross-sectional width and depth approximately the same as the cross-sectional width and depth of the sealing groove;

wherein the cross-sectional width of the reusable seal is smaller than the cross-sectional width of the sealing groove and the cross-sectional depth of the reusable seal is larger than the cross-sectional depth of the sealing groove; and wherein the sealing groove has a volume, and the reusable seal has a volume of approximately 100% to 120% of the volume of the sealing groove and is sufficient to form a seal when compressed in the sealing groove in the joint when the first pipeline element is connected to the second pipeline element.

2. The reusable seal of claim 1, wherein a flat surface is disposed onto the generally hexagonal cross-sectional shape of the reusable seal at a position on the reusable seal proximal to the joint in the sealing groove radially outward from a flow channel in each pipeline element such that when the first pipeline element and the second pipeline element are joined with the reusable seal disposed in the sealing groove, resulting compression of the reusable seal in the sealing groove presses the flat surface of the reusable seal into the radially outward joint between the first pipeline element and the second pipeline element.

3. The reusable seal of claim 1, wherein the fabric is woven, matted, or meshed.

4. The reusable seal of claim 1, wherein the fabric is one of cotton, polyester, aramid, coconut fiber, banana fiber, rayon, silk, fabric blends, or carbon fiber.

5. The reusable seal of claim 1, wherein the number of the plurality of strips of fabric and elastomer stacked to form the reusable seal is between 15 and 20, inclusive.

6. The reusable seal of claim 1, wherein the number of the plurality of strips of fabric and elastomer stacked to form the reusable seal is between 5 and 50, inclusive.

7. The reusable seal of claim 1, wherein the layers of strips of fabric and elastomer are oriented radially to the joint between the first pipeline element and the second pipeline element.

8. The reusable seal of claim 1, wherein the layers of strips of fabric and elastomer are oriented axially to the joint between the first pipeline element and the second pipeline element.

9. The reusable seal of claim 1, wherein at least one layer of fabric with no elastomeric material thereon is disposed on an entire outer surface of the reusable seal.

10. The reusable seal of claim 1, wherein at least one layer of fabric with no elastomeric material thereon is disposed only on a portion of an outer surface of the reusable seal in a position of at least one joint element of the sealing groove.

11. The reusable seal of claim 1, wherein the reusable seal further comprises a coiled spring disposed in an outer radial circumference of the reusable seal relative to the position of the reusable seal in the sealing groove.

12. The reusable seal of claim 1, wherein the reusable seal further comprises a channel and band disposed on the outer radial circumference of the reusable seal.

13. The reusable seal of claim 12, wherein the band is comprised of metal.

14. The reusable seal of claim 12, wherein the band is comprised of plastic.

15. The reusable seal of claim 1, wherein the reusable seal has disposed thereon a strut projecting radially inward along an entire inner circumference of the reusable seal; wherein the strut is comprised of at least one strip of fabric and elastomer fixedly attached to the reusable seal; wherein the strut has a width and a height; wherein the sealing groove in which reusable seal and strut is disposed further comprises a channel disposed between the sealing groove and a flow conduit disposed in the pipeline elements forming the sealing groove; wherein the channel has a height equal to the height of the strut and a width smaller than the width of the strut sufficient to form a seal between the strut and the channel under compression when the first pipeline element is joined to the second pipeline element.

* * * * *